United States Patent [19]
Lusinchi et al.

[11] Patent Number: 5,944,835
[45] Date of Patent: Aug. 31, 1999

[54] METHOD AND PROGRAMMABLE DEVICE FOR GENERATING VARIABLE WIDTH PULSES

[75] Inventors: Laurent Lusinchi, Saint Egreve; Jacques Prunier, Sassenage, both of France

[73] Assignee: SGS-Thomson Microelectronics S.A., Saint Genis, France

[21] Appl. No.: 08/863,320

[22] Filed: May 27, 1997

[30] Foreign Application Priority Data

May 31, 1996 [FR] France .................................. 96 06950

[51] Int. Cl.⁶ ..................................................... G06F 1/08
[52] U.S. Cl. ............................................................ 713/501
[58] Field of Search .................................. 395/555, 556, 395/557; 713/500–502

[56] References Cited

U.S. PATENT DOCUMENTS 5,293,628   3/1994   Langan et al. ........................... 395/550
5,627,500   5/1997   Wolaver et al. ......................... 332/112
5,745,741   4/1998   King ........................................ 395/555

OTHER PUBLICATIONS

French Search Report from French Patent Application 96 06950, filed May 31, 1996.
Patent Abstracts of Japan, vol. 010, No. 302 (E–445), Oct. 15, 1986 & JP–A–61 116994 (Matsushita Electric Ind. Co. Ltd.).
Patent Abstracts of Japan, vol. 017, No. 283 (E–1373), May 31, 1993 & JP–A–05 014186 (Matsushita Electric Ind. Co. Ltd).

*Primary Examiner*—Thomas M. Heckler
*Attorney, Agent, or Firm*—Wolf, Greenfield & Sacks, P.C.

[57] ABSTRACT

The present invention relates to a method for generating pulses using a microprocessor including a CPU and a counter programmable by at least one control bit and of a counting threshold, consisting of generating a first edge of a pulse by unconditionally forcing the state of an output signal of the counter to a state corresponding to a state of the control bit, and generating a second edge of the pulse by switching the state of the output signal at the end of the counting threshold.

20 Claims, 2 Drawing Sheets

METHOD AND PROGRAMMABLE DEVICE FOR GENERATING VARIABLE WIDTH PULSES

BACKGROUND OF THE INVENTION

1. Field of the Invention

The present invention relates to the generation of pulses by means of a microprocessor. The present invention more specifically relates to the generation of variable width pulse trains, the respective widths of the pulses being programmable by means of a CPU of a microprocessor. Such pulse train generation is used, for example, in infrared remote controls for monitoring infrared-emitting diodes, the sequence according to which the pulse trains are generated and/or their number of pulses constituting a control code likely to be decoded by a detector of the transmitted infrared signals.

More generally, the present invention applies to the generation of variable width pulses, where the frequency of the pulses and the shape factor (width of a pulse for a period) of each pulse are programmable by means of a microprocessor.

2. Discussion of the Related Art

FIG. 1 shows, partially and in the form of a block-diagram, an example of a conventional implementation of a programmable pulse generator.

Such a generator includes a CPU 1 for executing an instruction program previously stored in a memory (not shown). CPU 1 conventionally is associated with a programmable counter (TIMER) 2 which can be used as a time base, especially for exchanges between the microprocessor and an external peripheral, for example, an infrared-emitting diode (not shown).

CPU 1 also is associated with a prescaler 3, the function of which is to receive an external clock CLKE and to generate to CPU 1 and timer 2 an operating clock CLK0. The counting frequency of timer 2 is lower than frequency CLK0. Prescaler PS 3 is programmable via a first register (PS-REG) 4 to set the division rate of external clock CLKE and, thus, the operating frequency of CPU 1.

Timer 2 is programmable, from CPU 1, via certain bits of register 4 and of a second register (T-REG) 5.

CPU 1 communicates with registers 4 and 5 via at least one address, data and control bus 9. Although not shown for the sake of clarity, bus(es) 9 is (are) also used to exchange information between CPU 1 and other conventional components of the microprocessor or associated thereto (for example, memories).

In addition to registers 4 and 5, timer 2 includes a digital counter 6, for example, based on flip-flops, the counting frequency of which is given by clock signal CLK0. Digital counter 6 is associated with a comparator 7 which compares the value issued by counter 6 with a threshold TH stored in register 5. An output signal OC of comparator 7 is sent to a clock input of an output flip-flop 8, the function of which is to transfer the state of a signal CB, present at the input of flip-flop 8 and issued by register 4, to an output of the flip-flop for each rising edge, for example, of signal OC. When threshold TH is reached, timer 2 positions output signal S of flip-flop 8 to a high or low state according to the state of bit CB.

Since timer 2 constitutes a time base for the microprocessor, counter 6 generally counts continuously. Obtaining an edge on output S generally consists of reading the counting value of counter 6, for example, contained in register 5, and then inputting into register 5 a counting threshold TH corresponding to a time differential between the time of the current edge and time for the occurrence of the next edge. For the needs of the present description, the time at which a new threshold TH is available for comparator 7 will be called the reset time of the digital counter 6.

FIG. 2 shows, in the form of timing diagrams, the operation of a pulse generator such as shown in FIG. 1. FIG. 2 shows an example of output signal S having a maximum frequency according to a clock signal CLK0 and to the occupation of bus 9.

The occurrence of a rising or falling edge of signal S must be preceded by a programming of registers 4 and 5 by means of CPU 1 which requires two programming cycles. First, threshold TH is programmed in register 5 (times t0 to t1) i.e., one programming cycle, then bit CB is programmed in register 4 (times t1 to t2), i.e., a second programming cycle. By t1, TH is available to comparator 7, and counter 6 is reset. However, threshold TH has to be large enough, such that an edge (for example, a rising edge) does not occur before time t2, because the control bit is not available in PS-REG until t2. Therefore, edge f1 (for example, the rising edge) of the output signal cannot be generated until t2 and thus output S remains in its former state. Similarly, a following edge f2 (for example, a falling edge) can only occur after two cycles of programming registers 4 and 5, respectively (times t2 to t3 and times t3 to t4).

The minimum interval between two successive edges of signal S, the minimum width of a pulse I, is conditioned by the time required to perform two cycles of programming (of registers 4 and 5) by CPU 1. In the example shown, it is assumed that six cycles of clock CLK0 are required to program a register. Thus, the minimum width of a pulse I is twelve cycles of clock CLK0 and the minimum interval between two successive pulses is also twelve clock cycles. Accordingly, in a conventional generator such as shown in FIG. 1, the minimum period of a pulse corresponds to four cycles of programming (of registers 4 and 5), which requires 24 cycles of clock CLK0. Also, when the pulse period is the minimum period, the shape factor of the pulses must be 50%.

SUMMARY OF THE INVENTION

The present invention aims at providing a new pulse generation method and programmable device which enables to reduce the minimum width and the minimum period of the pulses for a given clock frequency and a given duration of the register programming cycles.

The present invention also aims at enabling the shape factor of the pulses generated at the maximum frequency to be different from 50%.

To achieve these objects, the present invention provides a method for generating pulses by means of a microprocessor including a CPU and a counter programmable by means of at least one control bit and of a counting threshold, consisting of:

generating a first edge of a pulse by unconditionally forcing the state of an output signal of the counter to a state corresponding to a state of the control bit; and generating a second edge of the pulse by switching the state of the output signal at the end of the counting threshold.

According to an embodiment of the present invention, the forcing of the output of the programmable counter is caused by the occurrence of a determined edge on a forcing signal generated by the CPU, the control bit being contained in a first register.

According to an embodiment of the present invention, the switching of the output signal is caused by a state switching at the output of a comparator between a counting value and the counting threshold contained in a second register.

The present invention also provides a pulse generator including a microprocessor provided with a CPU and a programmable counter, wherein the programmable counter includes a switching circuit having a multiplexer, a first input of which receives the control bit and a second input of which is connected to an inverted output of a flip-flop issuing the output signal, an output of the multiplexer being connected to a non-inverting input of the flip-flop.

According to an embodiment of the present invention, a logic OR-type combination, between the forcing signal and a signal indicating that the counting threshold has been reached, is sent on a clock input of the flip-flop.

According to an embodiment of the present invention, the multiplexer is controlled by a logic combination of an unconditional forcing signal generated by the CPU and of a signal for activating the switching circuit, the multiplexer selecting its second input only when the activation signal is in an active state and the forcing signal is in an inactive state.

BRIEF DESCRIPTION OF THE DRAWINGS

The foregoing and other objects, characteristics and advantages of the present invention will be discussed in detail in the following non-limiting description of specific implementations and embodiments of the present invention, taken in conjunction with the accompanying drawings, among which.

DETAILED DESCRIPTION

Figure 1:
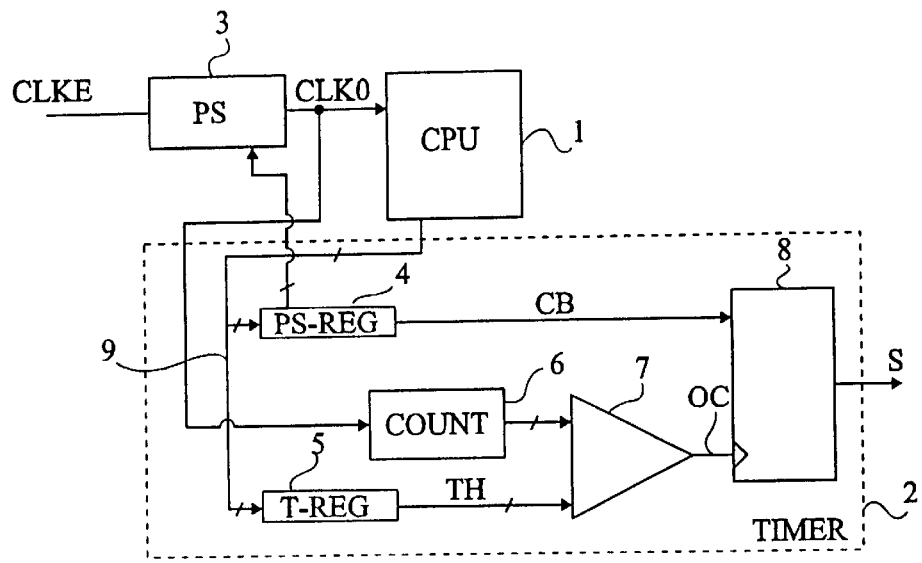
FIG. 1 is a block diagram of a conventional variable width pulse generator.
Figure 2:
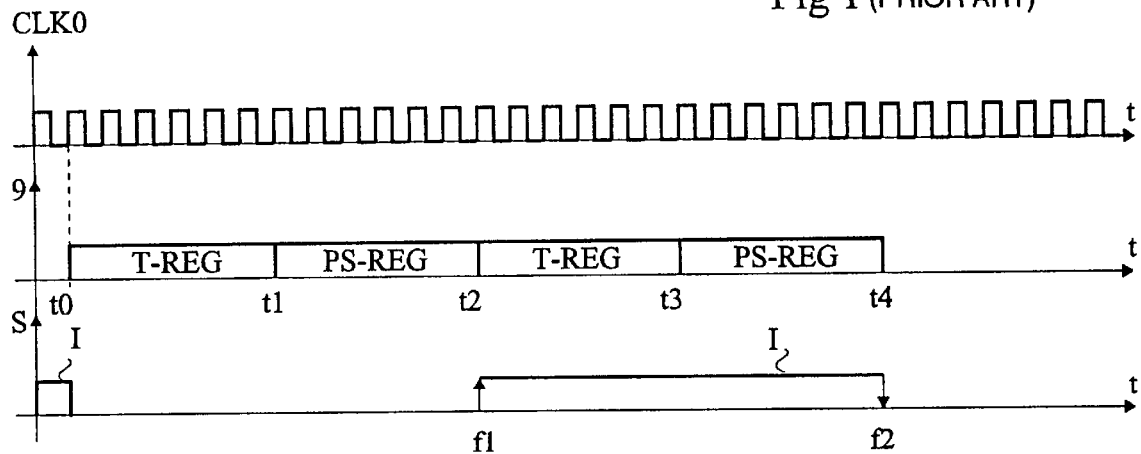
FIG. 2 shows timing diagrams of signals within the generator shown in FIG. 1.

For clarity, the same components have been referred to by the same references in the different drawings. For clarity still, only the components of the generator which are necessary for the understanding of the present invention have been shown in the drawings and will be described hereafter.

Figure 3:
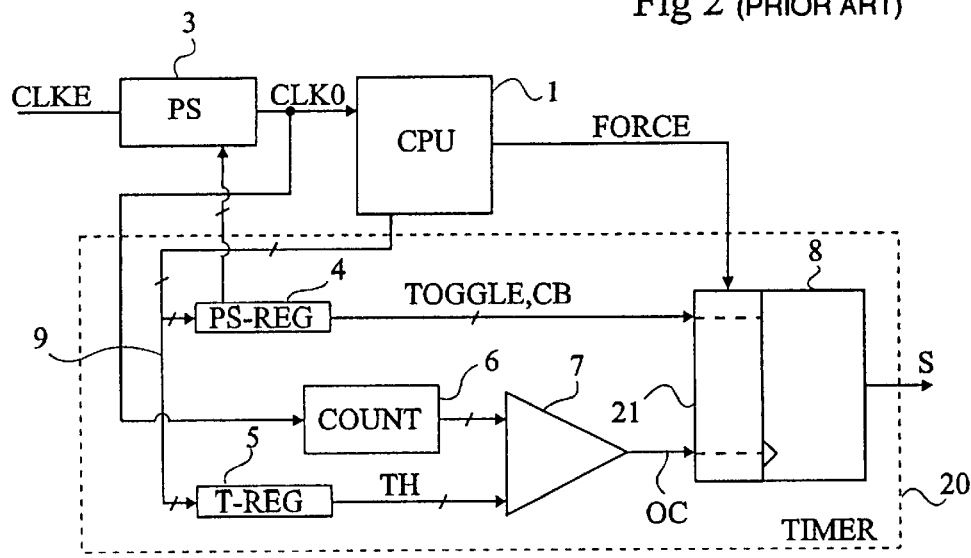
FIG. 3 is a block diagram of a pulse generator according to one embodiment of the present invention.

FIG. 3 shows, in the form of a block diagram, an embodiment of a pulse generator according to the present invention. The generator includes, as in conventional generators, a CPU 1, a prescaler 3 and a programmable counter (timer) 20.

Timer 20 includes, as in conventional generators, a digital counter 6, for example based on flip-flops (not shown), a comparator 7, an output flip-flop 8 and two registers, respectively 4 and 5.

A characteristic of the present invention is to provide a new function within the timer. This function consists of configuring timer 20 to force, unconditionally with respect to a counting threshold TH, the positioning of the state of an output signal S issued by flip-flop 8 to the state of a control bit CB contained in register 4, and to invert the state of signal S when threshold TH has been reached.

According to the present invention, flip-flop 8 is associated with a switching circuit 21, a detailed embodiment of which will be described later in relation with FIG. 5. Circuit 21 has the function of implementing the above-described new function when a configuring bit TOGGLE, for example contained in register 4, is active. The switching is activated by a determined state of a signal TOGGLE issued to circuit 21; the occurrence of a forcing instruction (signal FORCE) directly issued by CPU 1 to circuit 21 positions bit CB at the input of flip-flop 8 and triggers it, independently of the state of output signal OC of comparator 7. Thus, signal FORCE triggers one edge of signal S.

The use of signal FORCE requires no further connection between CPU 1 and counter 20. Indeed, conventional timers generally receive a programmable signal for triggering flip-flop 8. According to the invention, this programmable signal is signal FORCE. Similarly, since bit TOGGLE is contained in a register accessible by means of bus 9, it requires no further connection between CPU 1 and counter 20.

Another characteristic of the present invention is that the content of register 5 is now used to trigger a single edge of a pulse, the other edge being triggered by the occurrence of signal FORCE.

Thus, control bit CB is now used to set a single state of output signal S issued by timer 20, the other state being obtained by a switching, at the end of the counting performed by digital counter 6. Thus, according to the present invention, register 4 is programmed only once, for example, by an initialization of a pulse train generation program, to set the state of bit CB, and is not modified for the entire generation of the pulse train.

Figure 4:
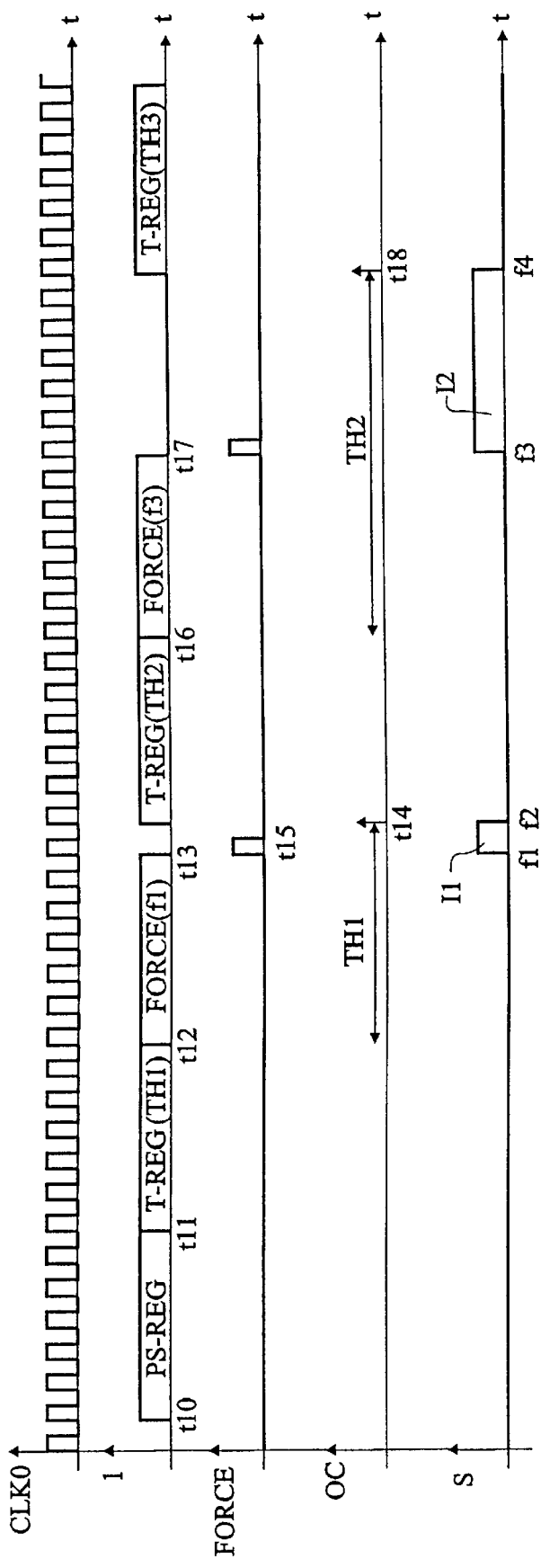
FIG. 4 shows timing diagrams of signals according to one implementation of a pulse generation according to the present invention.

FIG. 4 illustrates an implementation of the method according to the present invention by means of a generator such as shown in FIG. 3. FIG. 4 shows an example of a pulse train generation, with timing diagrams, of signals CLK0, FORCE, OC and S, as well as a signal showing the occupation of CPU 1 while programming registers 4 and 5 and generating the forcing instructions.

According to the present invention, first (times t10 to t11), register 4 is programmed with bit TOGGLE in its active state and bit CB in a selected state. Second (times t11 to t12), register 5 is programmed with a first counting threshold TH1. As previously, the reset of counter 6 occurs when threshold TH1 is programmed, i.e. at t12. In the example shown, the beginning of the programming of register 5 occurs as soon as possible. It should however be noted that the beginning time of the programming of threshold TH1 can be delayed according to the desired pulse period.

In the example shown in FIG. 4, it is assumed that bit CB has been programmed in a high state. A first rising edge of signal FORCE is sent by CPU 1 at a time t13. The generation of signal FORCE requires a processing by CPU 1. This processing generally lasts for a time lower than or equal to the programming time of a register.

Assuming that signal FORCE is active in the high state, a first rising edge f1 of a first pulse I1 occurs at time t13. Switching circuit 21, according to the present invention, is a cabled circuit which enables the transfer of bit CB almost simultaneously with the occurrence of a rising edge of signal FORCE.

At a time t14 when the counting value reaches threshold TH1, signal OC switches states (for example, it switches to the high state), which causes, according to the present invention, a switching (falling edge f2) of the state of signal S. Preferably, a pulse of signal FORCE lasts for a half-period of signal CLK0 (times t13 to t15) to enable signal S to switch states at the following rising edge of signal CLK0. The minimum width of a pulse then corresponds to one period of signal CLK0.

Since signal FORCE is independent from the counting, its rising edge can also be provided synchronized with a falling edge of signal CLK0, which reduces the minimum pulse width to one half-period of signal CLK0.

As early as time t14, register 5 can be reprogrammed with a second counting threshold TH2. Counter 6 thus can be reset as early as a time t16, corresponding to the end of the reprogramming of T-REG which lasts, for example, for six cycles of clock CLK0.

A new FORCE signal is programmed between time t16 and time t17. A second rising edge of signal FORCE occurs at time t17 and causes the switching to the high state of signal S (edge f3) which thus starts a second pulse I2. Pulse I2 ends (edge f4) at the end of the counting of value TH2 (time t18), from which time a new threshold TH3 can be programmed.

An advantage of the present invention is that the rising and falling edges of a pulse are independent of one another. Thus, the width of a pulse is decorrelated from the counting threshold, since the occurrence of its rising edge does not depend on counter 6. The minimum periodicity of the pulses corresponds, according to the present invention, substantially to the duration of both a programming cycle of register 5 and of a generation cycle of signal FORCE. The present invention thus enables obtaining a frequency substantially corresponding to double the maximum frequency of the pulses of a conventional generator, when the generated pulses have a minimum width.

Another advantage of the present invention is that, for a given frequency of the pulses, the programming time of the microprocessor is decreased and, in this way, the use of the CPU and energy is minimized. This advantage is particularly appreciable for applications operating on batteries, for example, infrared remote controls.

If bit CB is programmed in a low state, an inverted signal S with respect to the representation of FIG. 4 is obtained. The shape factor thus is inverted with respect to the case where bit CB is programmed in a high state.

Figure 5:
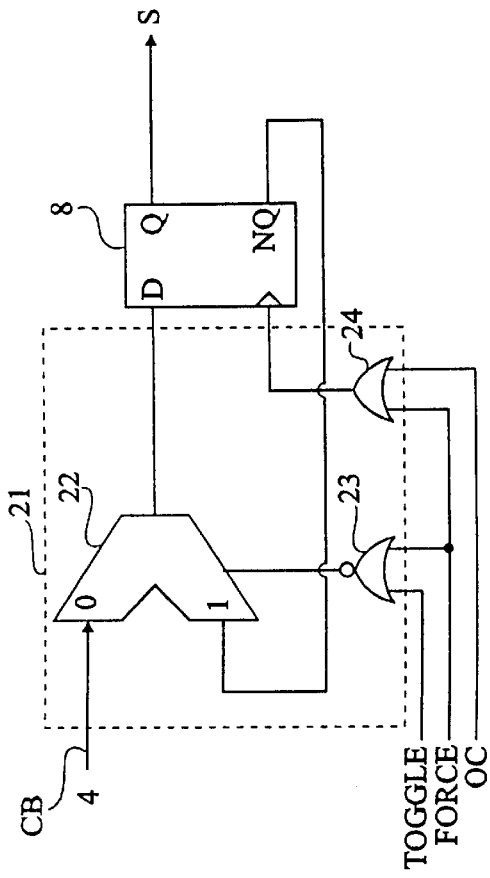
FIG. 5 is a schematic diagram of an embodiment of a switching circuit of the pulse generator shown in FIG. 3.

FIG. 5 shows an embodiment of a switching circuit 21 according to the present invention.

This circuit includes a two-input multiplexer 22, an output of which is connected to a D input of flip-flop 8. A first input of multiplexer 22 receives control bit CB issued by register 4. A second input of multiplexer 22 receives an inverted NQ output of flip-flop 8. Output signal S of programmable counter 20 is issued by a non-inverted Q output of flip-flop 8.

The selection of the input of multiplexer 22, for example, is performed by means of a NOR logic combination 23 of signals TOGGLE and FORCE. In this example, signal TOGGLE is active in the low state while signal FORCE is active in the high state.

Signal FORCE is also combined in an OR gate 24 with signal OC to enable an unconditional forcing with respect to the counting value.

At time t13 (FIG. 4) when signal FORCE switches to the high state, the output of gate 23 is in the low state. Thus, multiplexer 22 selects its first input and output signal S of flip-flop 8 is positioned in the high state.

At time t15, signal TOGGLE is in the low state, i.e., still in the active state, indicating that the switching function is activated, and the forcing pulse disappears. As a result, multiplexer 22 selects its second input, that is, the NQ output of switch 8. When the counter 6 has reached the threshold value TH, the output OC of comparator 7 switches to the high state, and the output of the OR gate 24 goes to the high state, triggering the clock input of flip-flop 8.

When signal TOGGLE is in a high state (inactive), the switching function of timer 20 is deactivated and it then operates in a conventional way.

An advantage of the present invention is that it enables a conventional operation of timer 20, which is particularly advantageous since it does not disturb the progress of other possible conventional programs using the time basis constituted by timer 20.

As in a conventional circuit where the program executed by CPU 1 determines the times t0 to t3 for triggering the programming of registers 4 and 5 to set the width and period of a pulse, the times t11 and t12 (t14 and t16) for triggering the programming of register 5 and of an unconditional forcing depend on the program executed by CPU 1.

Of course, the present invention is likely to have various alterations, modifications, and improvements which will readily occur to those skilled in the art. In particular, the practical implementation of switching circuit 21 can be modified according to the states, respectively active and inactive, of signals FORCE and TOGGLE.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for generating pulses by means of a microprocessor comprising the steps of:

unconditionally forcing an output of a programmable timer to a first state, corresponding to a state of a control bit received by the programmable timer, the first state producing a first edge of a pulse;

inverting the output of the programmable timer when a counting threshold, received by the programmable timer, has been reached, producing a second edge of the pulse; and wherein occurrence of the first edge of the pulse is independent of a count of the programmable timer.

2. A method according to claim 1, wherein the forcing step is triggered by generating a first edge of a CPU forcing signal.

3. A method according to claim 2, wherein the inverting step is triggered when an incremented counting value reaches the counting threshold.

4. A pulse generator comprising:

forcing means for unconditionally forcing an output of a programmable timer to a first state, corresponding to a state of a control bit received by the programmable timer, the first state producing a first edge of a pulse;

switching means for inverting the output of the programmable timer when a counting threshold, received by the programmable timer, has been reached, producing a second edge of the pulse; and wherein occurrence of the first edge of the pulse is independent of a count of the programmable timer.

5. A pulse generator comprising:

forcing means for unconditionally forcing an output of a programmable timer to a first state, corresponding to a state of a control bit received by the programmable timer, the first state producing a first edge of a pulse;

switching means for inverting the output of the programmable timer when a counting threshold, received by the programmable timer, has been reached, producing a second edge of the pulse; and wherein the programmable timer includes a switching circuit having a multiplexer, a first input of the multiplexer receives the control bit and a second input of the multiplexer receives an inverted output of a flip-flop, where the flip-flop generates the output of the programmable timer, an output of the multiplexer is connected to a non-inverting input of the flip-flop.

6. A pulse generator according to claim 5, wherein a clock input of the flip-flop receives an output of a logic OR circuit, a first input of the OR circuit receives a signal indicating that the counting threshold has been reached and a second input of the OR circuit receives a forcing signal generated by the forcing means, the forcing signal indicates that a first edge has been generated.

7. A pulse generator according to claim 6, wherein a control input of the multiplexer receives an output of a logic circuit, a first input of the logic circuit receives the forcing signal and a second input of the logic circuit receives a switching bit indicating that the switching means is activated, the multiplexer selecting the second input only when the switching bit is in an active state and the forcing signal is in an inactive state.

8. A pulse generator according to claim 7, wherein the forcing means comprises a forcing signal generated by a CPU and a first register storing the control bit supplied by the CPU and the first register further storing a switching bit, wherein a first state of the switching bit activates the CPU to issue the forcing signal which triggers the output of the programmable timer to switch to the first state corresponding to the state of the control bit;

wherein the switching means comprises a comparator receiving a first input from a counter and a second input from a second register storing the counting threshold, the comparator having an output, and wherein the switching means further comprises the switching circuit.

9. A pulse generator comprising:

forcing means for unconditionally forcing an output of a programmable timer to a first state, corresponding to a state of a control bit received by the programmable timer, the first state producing a first edge of a pulse;

switching means for inverting the output of the programmable timer when a counting threshold, received by the programmable timer, has been reached, producing a second edge of the pulse; and wherein the programmable timer comprises:

selecting means for selecting between the control bit or an inverse of a current output of the programmable timer, the selecting means selects the control bit when a switching bit is in an active state and a forcing signal from the CPU is in an active state, the selecting means selects the inverse of the current output of the programmable timer when the switching bit is in the active state and the forcing signal from the CPU is in the inactive state; and bistable means for outputting a signal having a state corresponding to the state of the control bit when the selecting means selects the control bit and for outputting a signal having a state corresponding to the inverse of the control bit when both the selecting means selects the inverse of the current output of the programmable timer and the counting threshold has been reached.

10. A pulse generator according to claim 9, wherein the force signal from the central processing unit triggers one edge of the pulse and wherein the counting threshold stored in the second register triggers the other edge of the pulse.

11. A pulse generator comprising:

a first register capable of storing a control bit indicating the state of the pulse, and a switching bit received from a central processing unit;

a second register capable of storing a counting threshold received from the central processing unit;

a counter receiving first clock input;

a comparator receiving an output of the counter and an output of the second register;

a switching circuit having a multiplexer, the multiplexer having a first input receiving the control bit from the first register, and a second input, a selector input of the multiplexer receives an input from a NOR logic gate, the NOR logic gate receives the switching bit and forcing signal from the central processing unit, the multiplexer further having an output; and a flip-flop having a noninverting input which receives the output of the multiplexer, the flip-flop having a clock input receiving an output of an OR logic gate, the OR logic gate receiving the forcing signal and the output of the comparator, the inverted output of the flip-flop providing an input to the second input of the multiplexer, the non-inverting output of the flip-flop providing the pulses.

12. A pulse generator according to claim 11, wherein the first clock input is provided to the central processing unit and the counter by a prescaler, which receives an external clock signal.

13. A pulse generator according to claim 12, wherein the first register is programmed by the central processing unit only once per pulse train, and wherein the counter is reset by each programming of the second register.

14. A method according to claim 11, wherein the occurrence of a forcing instruction issued by the CPU, positions the control bit at the input of the flip-flop and triggers the flip-flop independently of the state of the output of the comparator.

15. A method for generating a pulse train by means of a microprocessor comprising the steps of:

programming a first register with a control bit in a selected state corresponding to the state of the pulses in the train, the control bit is programmed once for the train of pulses;

programming a second register with a counting threshold;

generating a first signal responsive to a first CPU signal and having a state corresponding to the state of the control bit, the first signal corresponds to a first edge of the pulse;

issuing a switching signal when a counter reaches the counting threshold, the switching signal corresponds to a second edge of the pulse; and resetting the counter each time the counting threshold is programmed;

wherein the programming of the counting threshold corresponds to the second edge of each subsequent pulse.

16. A method for generating a pulse train as in claim 15, wherein the first register is also programmed with a switching bit, the switching bit is programmed in an active state to indicate a pulse train generation where the occurrence of the first edge of the pulse is only dependent on a duration of programming the second register and on a duration of the issuance of the first CPU signal, and further, in the active state, the switching bit indicates a mode where pulse widths are limited only by one half of the CPU clock cycle, and a minimum pulse period is substantially equals to the duration of programming the second register and to the duration of generating the first CPU signal.

17. A method according to claim 15, wherein the first and second edges of a pulse are independent form each other.

18. A method according to claim 15, wherein a width of a pulse is uncorellated with the counting threshold.

19. A method according to claim 15, wherein programming performed by the CPU is minimized.

20. A method according to claim 15, wherein the control bit is programmed in a high state to obtain a high shape factor and the control bit is programmed in a low state to obtain a low shape factor.

* * * * *